June 1, 1937. R. JEOFFROY 2,082,163
SOIL EROSION CONTROLLING APPARATUS
Filed June 18, 1936 2 Sheets-Sheet 1

Inventor
Roy Jeoffroy
By Clarence A. O'Brien
Hyman Berman
Attorneys

Patented June 1, 1937

2,082,163

UNITED STATES PATENT OFFICE 2,082,163

SOIL EROSION CONTROLLING APPARATUS

Roy Jeoffroy, Perryton, Tex.

Application June 18, 1936, Serial No. 86,015

1 Claim. (Cl. 55—74)

This invention relates to new and useful improvements in implements for treating soil in such a manner as to retard erosion.

The purpose of this implement is to prepare ground for wheat, summer fallow and work up stubble after harvesting, and various other purposes and most particularly in the use of the same on a contour plan of farming. The implement will produce small furrows which will receive and retain moisture as well as listed land.

Another important object of the invention is to provide an apparatus of the character stated which will be of stable construction and not susceptible to the ready development of defects.

These and various other important objects and advantages of the invention will become apparent to the reader.

In the drawings:—

Figure 1:
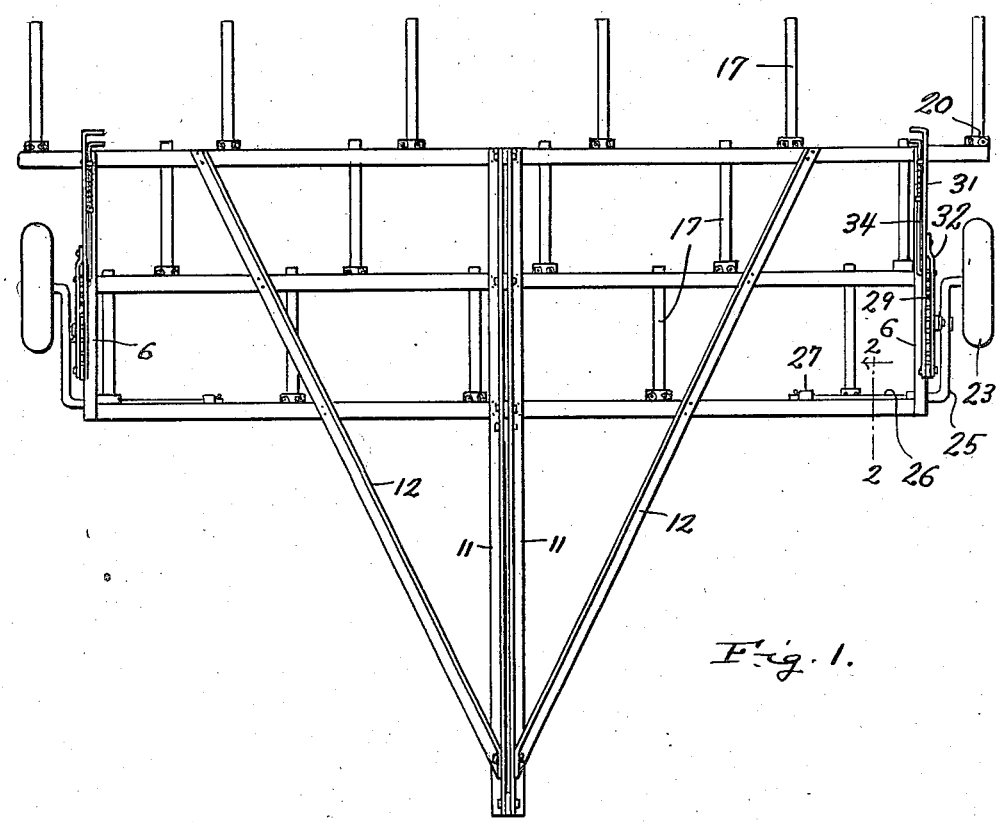
Figure 1 represents a top plan view of the apparatus.
Figure 2:
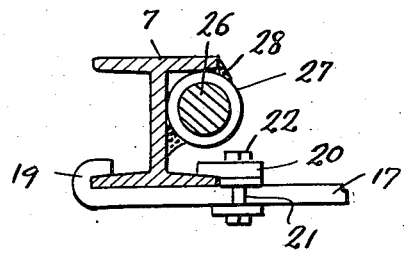
Figure 2 is an enlarged fragmentary detailed sectional view on the line 2—2 of Figure 1.
Figure 3:
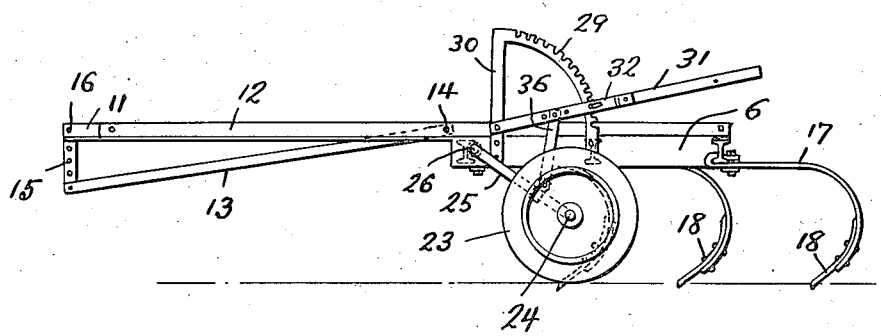
Figure 3 is a side elevational view of the apparatus.
Figure 4:
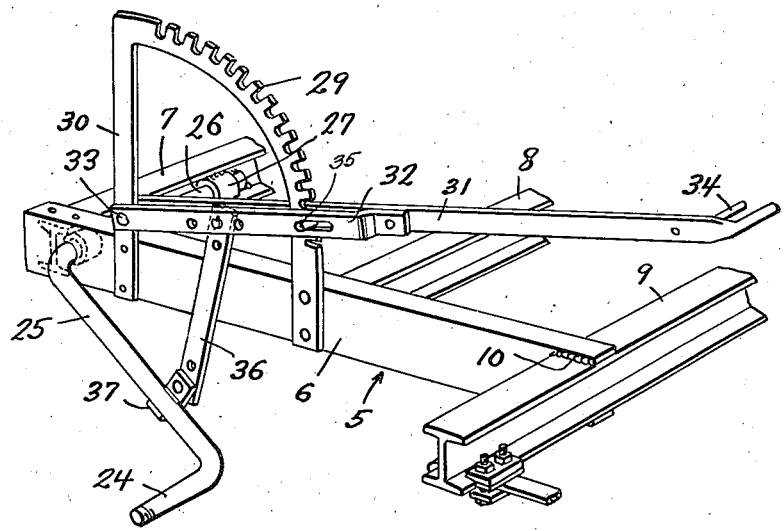
Figure 4 is a fragmentary perspective view of the frame adjusting means.

Referring to the drawings wherein like numerals designate like parts, it can be seen that the apparatus consists of the frame 5 made up of the channeled end members 6—6 and the connecting I-beams 7, 8, and 9. The rear ends of the channel members 6 are bifurcated and the resulting furcations extend above and below portions of the rear I-beam 9 inwardly of the ends thereof where the furcations are welded to the I-beam as at 10.

Angle iron members 11—11 extend forwardly across the I-beams 7, 8 and 9 and forwardly thereof and are braced by additional angle members 12—12 extending across the aforementioned I-beams and connecting to the forward ends of the angle members 11.

A brace bar 13 has its rear end interposed between the angle members 11—11 and is secured thereto as at 14 while its forward end connects to the lower end of the hitch member 15 with the upper end of the hitch member secured between the forward ends of the angle members 11—11 as at 16.

The ground engaging elements are represented by J-shaped spring members 17 having the shovels 18 secured to the lower ends thereof. The upper ends are provided with hook members 19 for engaging over the forward edges of the lower flanges of the rear I-beam 9. Each of these spring members 17 is provided with a clamp plate 20 secured in place by bolts 21 and nuts 22, these clamp plates 20 engaging over the remaining lower flange of the rear I-beam 9.

It can be seen that additional spring members 17 are provided for the other beams 7—8 and are secured in the same manner by the hooks 19 and clamp plates 20.

Each of the wheels 23 is provided with a spindle 24 on which the same is mounted and this spindle is carried by the crank 25 of the shaft 26 which is journaled through bearings 27 on the I-beam 7, which bearings are welded in place as at 28.

An arcuate rack 29 is secured by leg members 30 to each of the end channel members 6. Each of these racks 29 is provided with a control lever 31 provided with a forked portion 32 straddling the rack and being pivotally connected to one of the legs 30 as at 33. A detent 34 including a transverse pin 35 is spring-pressed so that the pin 35 will normally engage in the teeth of the rack 29. The fork 32 has a link member 36 pivotally connected thereto and depending to pivotally connect the angle member 37 which in turn is welded to the crank 25.

It can be seen, that by actuating the lever 31, proper adjustment of the frame 5 above the wheels 23 can be accomplished with the resulting relationship of the shovels 18 with respect to the ground.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

In a ground working machine, a wheeled frame, a draft appliance attached to the frame, said draft appliance comprising a pair of angle bars each secured at its rear end portion to the frame and extending forwardly from the frame in close spaced parallel relation to each other, a hitch member having its upper end secured to the forward end of the angle bars and between the same, and a brace bar extension rearwardly from the lower end of the hitch member and having its rear end secured to the said angle bars at a point between the intermediate portions thereof.

ROY JEOFFROY.